United States Patent [19]

Shimada

[11] Patent Number: 5,511,077
[45] Date of Patent: Apr. 23, 1996

[54] FRAME TRANSMISSION SYSTEM

[75] Inventor: Naohiro Shimada, Tokyo, Japan

[73] Assignee: NEC Corporation, Tokyo, Japan

[21] Appl. No.: 260,799

[22] Filed: Jun. 16, 1994

[30] Foreign Application Priority Data

Jun. 30, 1993 [JP] Japan .................................. 5-162095
Aug. 25, 1993 [JP] Japan .................................. 5-232278

[51] Int. Cl.$^6$ .................................................. H04J 3/07
[52] U.S. Cl. ................................ 370/102; 375/363
[58] Field of Search ......................... 370/102, 100.1, 370/112, 110.1, 110.4, 105.1, 105.2, 105.3, 99; 375/363, 371

[56] References Cited

U.S. PATENT DOCUMENTS 4,667,324  5/1987  Graves .................................. 370/102
4,884,268  11/1989 Goto .................................... 370/102
4,935,921  6/1990  Ishizaki et al. ...................... 370/102

OTHER PUBLICATIONS

"American National Standard for Telecommunications", Aug. 1990, pp. 1–12.
Beatriz Ugrinovic, "Proposed Contribution to CCITT (ITU-T), T1×1. 4 AT&T", Jan. 1992, pp. 1–11.
David Smith, "Digital Transmission System", 1993, pp. 235–237.

Primary Examiner—Melvin Marcelo
Assistant Examiner—Huy D. Vu
Attorney, Agent, or Firm—Foley & Lardner

[57] ABSTRACT

In a frame transmission system for transmitting multi-frames of a DS3.C-bit parity frame system as prescribed in American National Standard and also in Proposed Contribution to CCITT (ITU-T), C1-bits assigned to the prior art DS3.C-bit parity frame, i.e., 3×3=9 C-bits (fixed bits) for the 2nd, 6th and 7th channels, are used as control bits of DS2 level signal for intrinsic purposes. These bits may be processed in their entirely in the same manner as with the prior art control bits.

12 Claims, 11 Drawing Sheets

|   | ←85 SLOTS→ | ←85 SLOTS→ | ←85 SLOTS→ | ←85 SLOTS→ | ←85 SLOTS→ | ←85 SLOTS→ | ←85 SLOTS→ | 85 SLOTS→ |
|---|---|---|---|---|---|---|---|---|
| 1 | X [84] | F1 [84] | AIC [84] | F0 [84] | Na [84] | F0 [84] | FEA [84] | F1[0][S1][83] |
| 2 | X [84] | F1 [84] | C1 [84] | F0 [84] | C1 [84] | F0 [84] | C1 [84] | F1[1][S2][82] |
| 3 | P [84] | F1 [84] | CP [84] | F0 [84] | CP [84] | F0 [84] | CP [84] | F1[2][S3][81] |
| 4 | P [84] | F1 [84] | FEBE [84] | F0 [84] | FEBE [84] | F0 [84] | FEBE [84] | F1[3][S4][80] |
| 5 | M0 [84] | F1 [84] | DLt [84] | F0 [84] | DLt [84] | F0 [84] | DLt [84] | F1[4][S5][79] |
| 6 | M1 [84] | F1 [84] | C1 [84] | F0 [84] | C1 [84] | F0 [84] | C1 [84] | F1[5][S6][78] |
| 7 | M0 [84] | F1 [84] | C1 [84] | F0 [84] | C1 [84] | F0 [84] | C1 [84] | F1[6][S7][77] |

28 F-bits(F0=0, F1=1)
2 X-bits(X=0 or 1,but must agree) X=1:Normal,X=0:LOS.OOF.AIS
2 P-bits(P=0 or 1,but must agree) P=0:Check Sum=0,P=1:Check Sum=1
3 M-bits(M0=0,M1=1)
1 AIC-bit(Application Identification Cannel=1:C-BIT PARITY, AIC=[random]:M13)
1 Na-bit(Na=1)
1 FEA-bit(Far End Alarm Channel)
9 C1-bits(C1=1)

3 CP-bits(CP=P)
3 FEBE-bits(FEBE=111:no error, FEBE≠111:error)
3 DLt-bits(Terminal to Terminal Data Link)
7 S-bits(S1-S7 are Available Time Slot For Stuffing)
4697 Information bits 4760 Total

FIG. 4
PRIOR ART

← 85 SLOTS →|← 85 SLOTS →|← 85 SLOTS →|← 85 SLOTS →|← 85 SLOTS →|← 85 SLOTS →|← 85 SLOTS →|← 85 SLOTS →

| | | | | | | | | |
|---|---|---|---|---|---|---|---|---|
| 1 | X [84] | F1 [84] | AIC [84] | F0 [84] | Na [84] | F0 [84] | FEA [84] | F1[0][S1][83] |
| 2 | X [84] | F1 [84] | C1 [84] | F0 [84] | C1 [84] | F0 [84] | C1 [84] | F1[1][S2][82] |
| 3 | P [84] | F1 [84] | CP [84] | F0 [84] | CP [84] | F0 [84] | CP [84] | F1[2][S3][81] |
| 4 | P [84] | F1 [84] | FEBE [84] | F0 [84] | FEBE [84] | F0 [84] | FEBE [84] | F1[3][S4][80] |
| 5 | M0 [84] | F1 [84] | DLt [84] | F0 [84] | DLt [84] | F0 [84] | DLt [84] | F1[4][S5][79] |
| 6 | M1 [84] | F1 [84] | C1 [84] | F0 [84] | C1 [84] | F0 [84] | C1 [84] | F1[5][S6][78] |
| 7 | M0 [84] | F1 [84] | C1 [84] | F0 [84] | C1 [84] | F0 [84] | C1 [84] | F1[6][S7][77] |

28 F-bits(F0=0,F1=1)
2 X-bits(X=0 or 1,but must agree) X=1:Normal,X=0:LOS.OOF.AIS
2 P-bits(P=0 or 1,but must agree) P=0:Check Sum=0,P=1:Check Sum=1
3 M-bits(M0=0,M1=1)
1 AIC-bit(Application Identification Cannel=1:C-BIT PARITY, AIC=[random]:M13)
1 Na-bit(Na=1)
1 FEA-bit(Far End Alarm Channel)
9 C1-bits(C1=1)

3 CP-bits(CP=P)
3 FEBE-bits(FEBE=111:no error, FEBE≠111:error)
3 DLt-bits(Terminal to Terminal Data Link)
7 S-bits(S1-S7 are Available Time Slot For Stuffing)

4697 Information bits

4760 Total

FRAME TRANSMISSION SYSTEM

BACKGROUND OF THE INVENTION

The present invention relates to a digital time-division multiple transmission and, more particularly, to improvements in the DS3.C-bit parity frame system, which is prescribed in American National Standard T1.107-1990 and also in Proposed Contribution to CCITT (ITU-T), T1x1. 4 AT&T, Jan. 27, 1992.

More specifically, the present invention relates to a DS3.C-bit parity frame transmitting and receiving system and, more particularly, to a transmitting and receiving system used in a DS3 level, DS3.C-bit parity frame transmission system in a PCM communication system.

In the DS3.C-bit parity frame system, 21 DS2 level control bits (C-bits) which are provided in one multi-frame, are used for providing various alarms and also for exchange of information.

Figure 4:
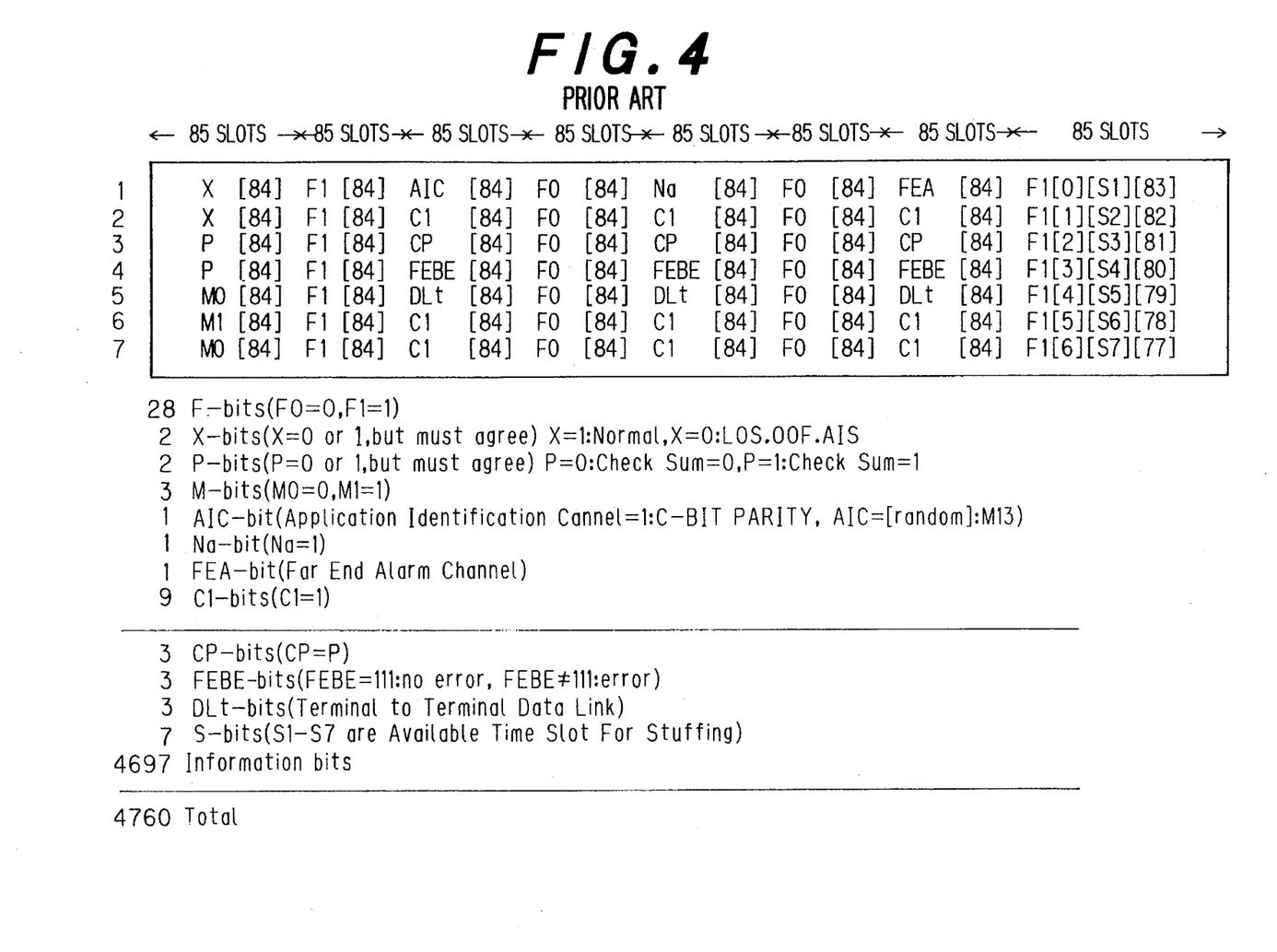
FIG. 4 shows the configuration of the multi-frame.

FIG. 4 shows the configuration of the multi-frame. The multi-frame has a 4760-bit configuration comprising 7 rows×8 columns×85 slots. The 1st row, 1st column contains information of an X-bit and 84 other bits. The 1st row, 2nd column contains information of a F1-bit and 84 other bits. The 1st row, 3rd column contains information of an AIC-bit and 84 other bits. The 1st row, 4th column contains information of a F0-bit and 84 other bits. The 1st row, 5th column contains information of a Na-bit and 84 other bits. The 1st row, 6th column contains information of a F0-bit and 84 other bits. The 1st row, 7th column contains information of FEA-bit and other bits. The 1st row, 8th column contains information of a F1-bit (0 bit), an S1-bit and 83 other bits. Among the 4760 bits are 28 F-bits, 2 X-bits, 2 P-bits, 3 M-bits, one AIC-bit, one Na-bit, one FEA-bit, 9 C1-bits, 3 CP-bits, 3 FEBE-bits, 3 DLt-bits, 7 S-bits and 4697 data bits.

In the prior art DS3.C-bit parity frame system, however, the control bits which are necessary for DS2 level signal are used for other purposes. Therefore, where the DS3.C-bit parity frame system is used, it is impossible to accommodate and handle the DS2 level signal.

American National Standard and Proposed Contribution to CCITT, noted above, prescribe the DS3. C-bit parity frame transmission system, and FIG. 9 shows the format (or configuration) of the prescribed DS3.C-bit parity multi-frame.

Figure 10:
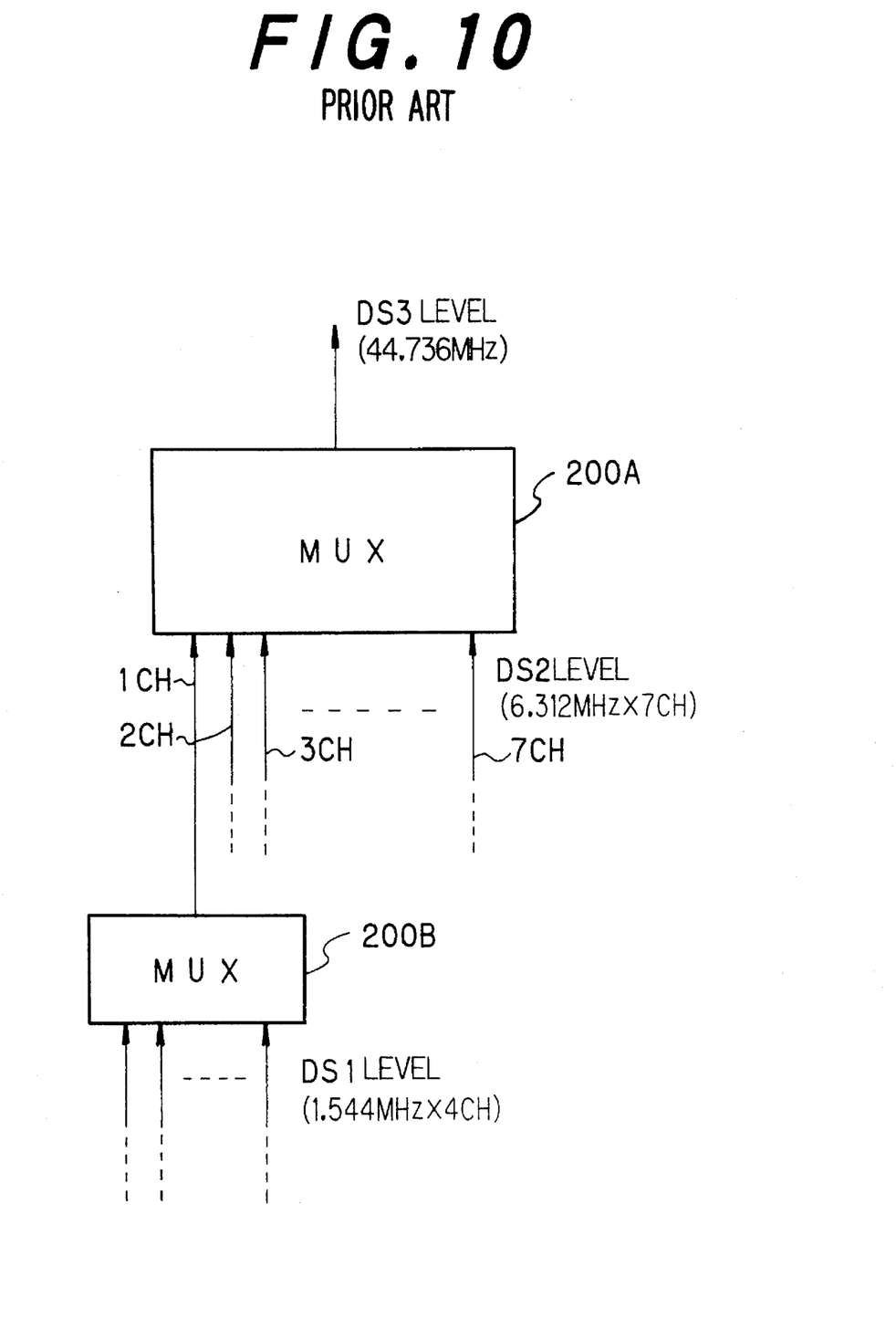
FIG. 10 shows a block diagram of the PCM multiplex system.

This frame format is obtained with a PCM multiplex system as shown in FIG. 10. A multiplex signal of DS3 level (44.736 MHz) is obtained through bit multiplexing of DS2 level signal (6.312 MHz) for 7 channels in a multiplexer 200A. The DS2 level signal for each channel is obtained through bit multiplexing of DS1 level signal (1.544 MHz) for 4 channels.

Figure 9:
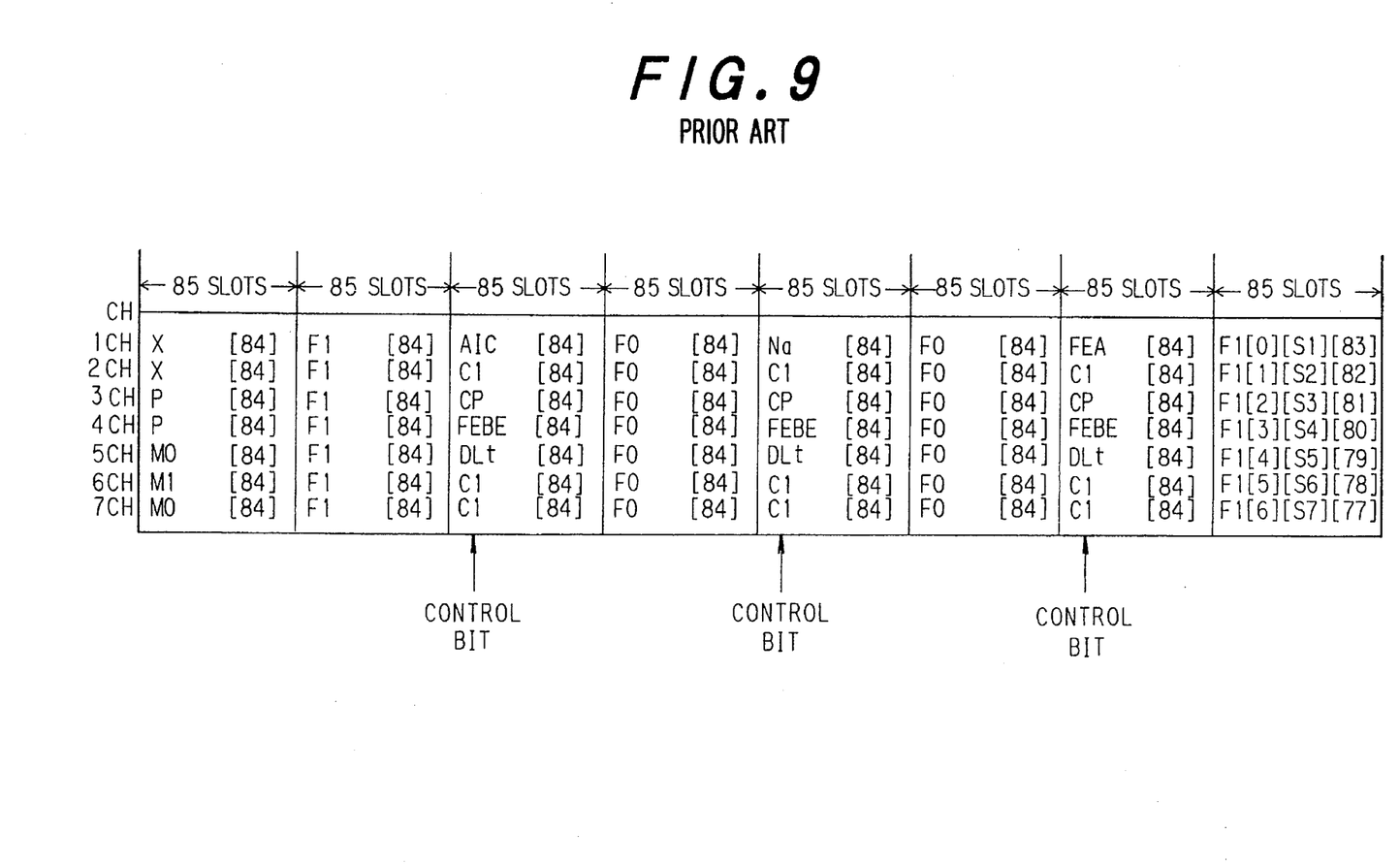
FIG. 9 shows the format (or configuration) of the prescribed DS3.C-bit parity multi-frame.

Shown in FIG. 9 is the DS3.C-bit parity multi-frame format that is obtained in this way. The format comprises 7 channels, i.e., 1st to 7th channels. Each channel comprises 85 slots (or bits)× 8, i.e., 680 slots (or bits). The leading bit of each 85-slot group contains a piece of prescribed information (i.e., overhead information, such as X, F1, AIC, F0, Na, FEA, P, CP, FEBE, DLt) that is superimposed, and DS2 level signal bits are multiplexed to each slot of the 84 other slots.

Particularly, bit portions shown by control bits in the frame shown in FIG. 9 are commonly called C-bits. In one multi-frame, 7×3=21 C-bits are present. These 21 C-bits are used for providing various alarms and also for transmitting and receiving control information.

Figure 11:
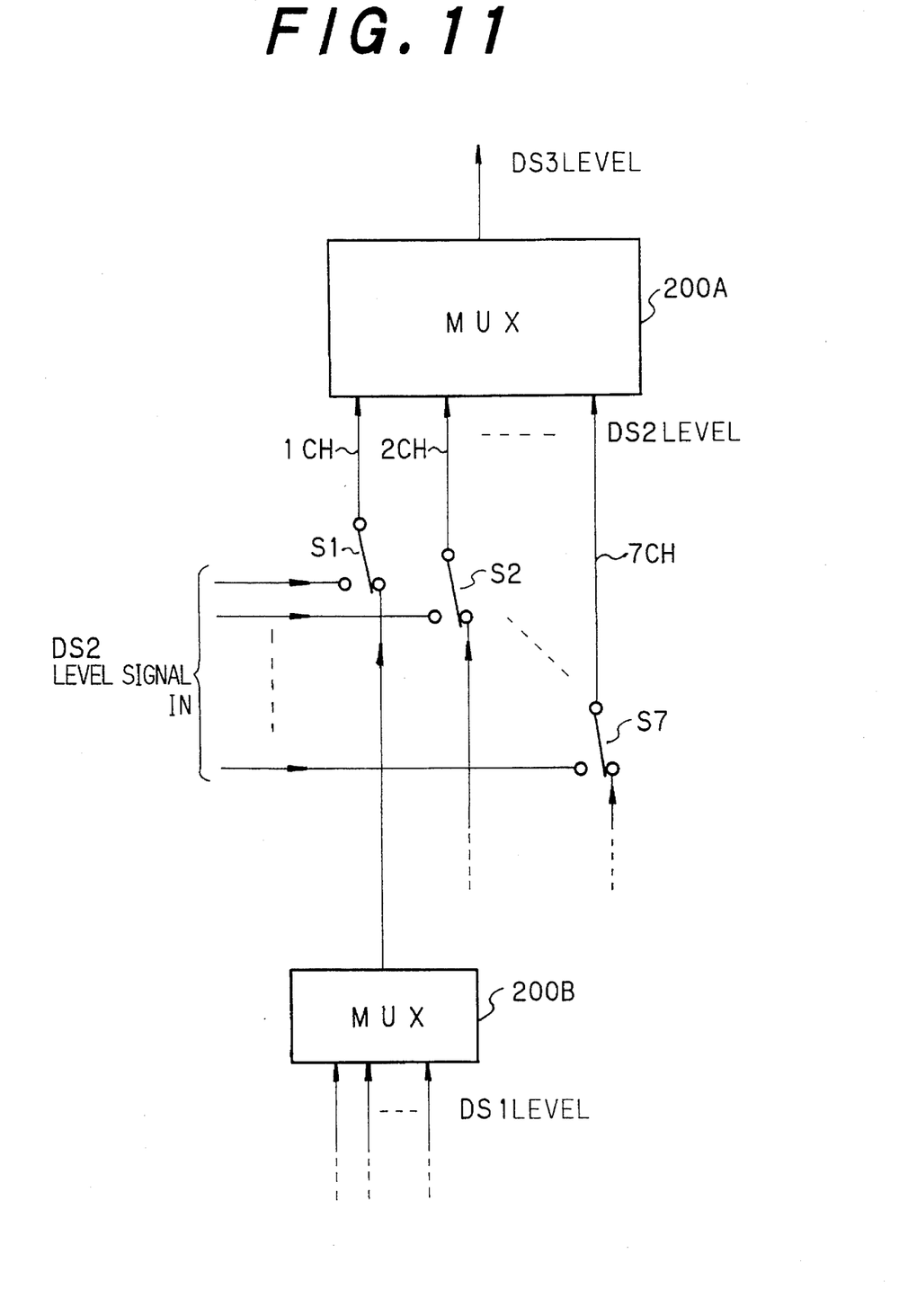
FIG. 11 shows the PCM communication system.

In the PCM communication system with such a frame format, it is sometimes required as shown in FIG. 11, that for multiplexing the DS2 level signal applied to the multiplexer 200A to obtain the DS3 level signal, the DS2 level signal be externally supplied directly as input to the multiplexer 200A and multiplexed to the DS3 level signal through one of switches S1–S7, instead of obtaining the DS2 level signal through the multiplexing of the DS1 level signal as the preceding level signal.

For example, it may be desired that DS2 level signal be accommodated externally in the 1st channel of the DS2 level through the switch S1. However, the 1st channel control bits (i.e., three C-bits of AIC, Na and FEA in FIG. 9) have already been used for other purposes, and consequently, it is impossible to accommodate the external DS2 level signal.

This also applies to the other channels. Therefore, in the prior art DS3 level C-bit parity multi-frame format PCM communication system, no DS2 level signal is externally supplied and accommodated.

SUMMARY OF THE INVENTION

It is an object of the present invention to provide a frame transmission system, which can solve the above problem and permits the DS2 level signal to be accommodated in the frame of the DS3.C-bit parity frame system.

It is another object of the present invention to provide a DS3 frame transmitting and receiving apparatus, which can accommodate externally supplied DS2 level signal in a desired channel of the DS3 level signal multi-frame.

According to an aspect of the present invention, there is provided a frame transmission system for transmitting multi-frames of a DS3.C-bit parity frame system as prescribed in American National Standard and also in Proposed Contribution to CCITT, wherein 3×3=9 C1-bits assigned to the 2nd, 6th and 7th channels of the multi-frame are used as DS2 level signal control bits, and three DS2 level signals at maximum are accommodated in one multi-frame.

The frame transmission system comprises a transmitter including means for stuff processing on up to three DS2 level signals and means for inserting information about the stuff processing in the C1-bits of the multi-frame.

The frame transmission system comprises a receiver including means for extracting the control information from the C1-bits of the received multi-frame and means for de-stuff processing on DS2 signal according to the control information.

According to another aspect of the present invention, there is provided a transmitter for transmitting DS3 frames each comprising a plurality of channels, the first to third channels in said plurality of channels each including three out-of-use C1-bits, comprising: a first stuff circuit for accommodating a DS2 level signal in the first channel; means for superimposing stuff information of the first stuff circuit on the out-of-use C1 bits of the first channel; a second stuff circuit for accommodating a different DS2 signal in an externally assigned channel other than the first channel; means for superimposing the stuff information of the second stuff circuit on the out-of-use C1-bits of the second channel; and means for superimposing channel assignment information indicative of the assigned channel on the out-of-use C1-bits of the third channel.

According to other aspect of the present invention, there is provided a DS3 frame transmitter/receiver comprising means for receiving a DS3 frame and extracting channel assignment information, means or extracting stuff information, a de-stuff circuit for de-stuff the channel assigned by the extracted channel assignment information according to the extracted stuff information, and a second de-stuff circuit for de-stuff the first channel by using the extracted stuff information.

More specifically, C1-bits assigned to the prior art DS3.C-bit parity frame, i.e., 3×3=9 C-bits (fixed bits) for the 2nd, 6th and 7th channels, are used as control bits of DS2 level signal for the intrinsic purpose. These bits may be processed in the entirely the same manner as with the prior art control bits.

Further, in DS3.C-bit parity multi-frame format (FIG. 3), the 3 control bits C1 of the 2nd channel, 3 control bits C1 of the 6th channel and 3 control bits C1 of the 7th channel, among the 21 control bits, are all defined as out-of-use bits fixed to "1".

These 3×3 out-of-use C1-bits are used as control information for the externally supplied DS2 level signal to be accommodated, and at least two DS2 level signals can be externally supplied to be accommodated in DS3 signal.

Of the C1-bits of the 2nd, 6th and 7th channels with the out-of-use control bits (C1-bits), the three C1 bits of the 7th channel, for instance, are used as control information bits (stuff information bits) for the DS2 level signal to be accommodated in the 7th channel, while the three C1-bits of the 6th channel, for instance, are used as control information bits (stuff information bits) for the DS2 level signal to be accommodated in any other desired channel. The three C1-bits of the 2nd channel are used as channel assignment information for assigning the desired channel for accommodating the DS2 level signal therein. In this way, it is possible to accommodate two externally supplied DS2 level signals in two channels, i.e., the 7th channel and another channel.

Other objects and features will be clarified from the following description with reference to the attached drawings

DETAILED DESCRIPTION OF THE PREFERRED EMBODIMENTS

Figure 1:
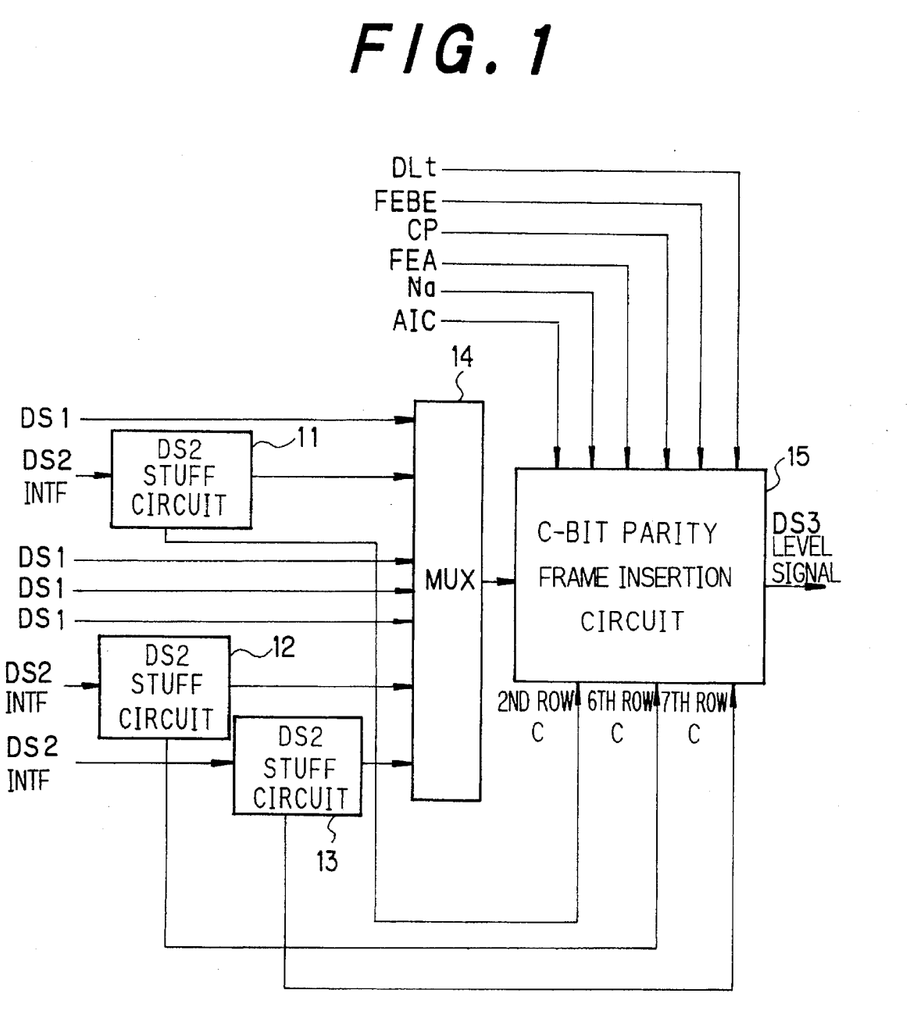
FIG. 1 shows a block diagram showing the transmitting side.
Figure 2:
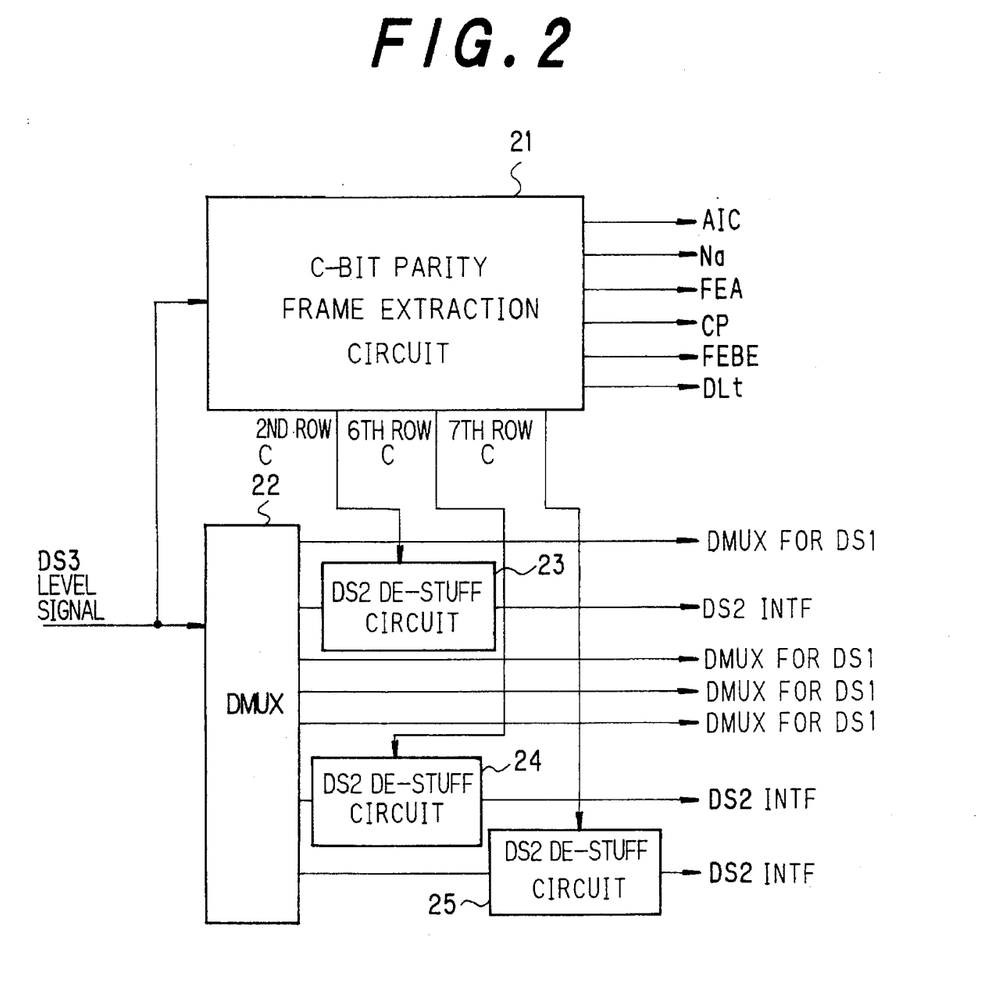
FIG. 2 shows a block diagram showing the receiving side.

FIGS. 1 and 2 show a frame transmission apparatus embodying the present invention. FIG. 1 is a block diagram showing the transmitting side, and FIG. 2 is a block diagram showing the receiving side.

The transmitting side, as shown in FIG. 1, has three DS2 stuff circuits 11 to 13 as means for stuff processing up to three DS2 level signals. Signals from a DS2 interface are supplied to the three DS2 stuff circuits 11 to 13. The outputs of the DS2 stuff circuits 11 to 13 are multiplexed as 2nd, 6th and 7th channel signals, respectively, in a multiplexer 14. The DS1 inputs are supplied as the other channel inputs. The multiplexed signal thus obtained is input to a C-bit parity frame insertion circuit 15, to which necessary signals (i.e., bits of AIC, Na, FEA, CP, FEBE and DLt and C1 bits) are inserted, and which outputs DS3 level signal. At this time, into the C-bit parity frame insertion circuit 15, information concerning the stuff processing in the DS3 stuff circuits 11 to 13 is inserted in the C1 bits of the multi-frame.

The receiving side, as shown in FIG. 2, has a C-bit parity frame extraction circuit 21, which extracts necessary bits (i.e., bits of AIC, Na, FEA, CP, FEBE and DLt and C1 bits) contained in the received DS3 level signal, and a de-multiplexer 22 for de-multiplexing the received DS3 level signal. The 2nd, 6th and 7th channel outputs of the de-multiplexer 22 are supplied to respective DS2 de-stuff circuits 23 to 25. The DS2 de-stuff circuits 23 to 25 are also supplied control information, which is extracted from the C1-bits in the C-bit parity frame extraction circuit 21. According to this control information, the de-stuff processing of the DS level signal is executed. The control information is constituted by the control bits of the DS2 level signals themselves, and similar to the prior art processing the stuff processing is executed through majority decision of three control bits each corresponding to each DS2 level signal.

Figure 3:
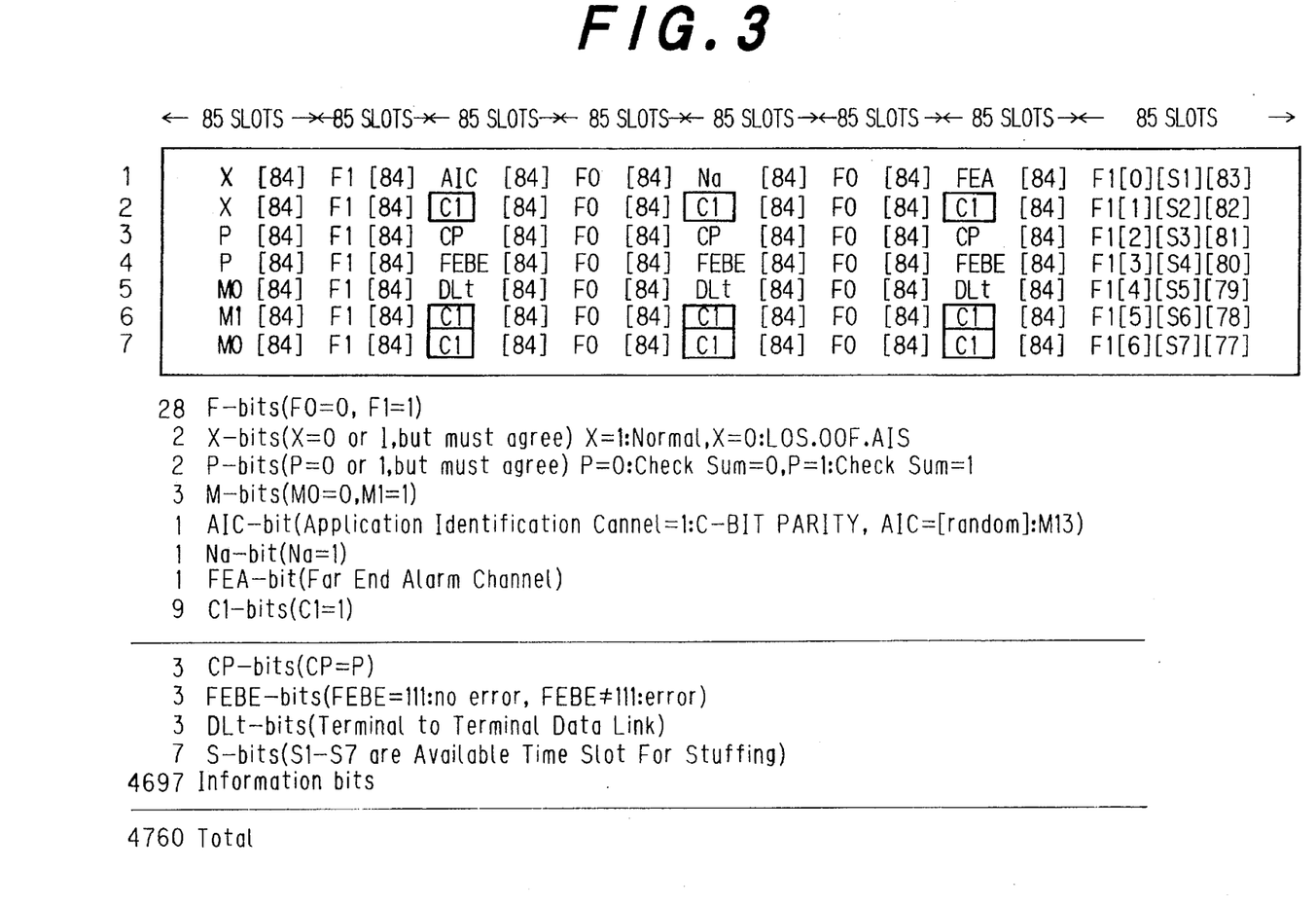
FIG. 3 shows C1-bit position in the multi-frame configuration of the DS3.C-bit parity frame.

FIG. 3 shows C1-bit position in the multi-frame configuration of the DS3 C-bit parity frame. Three C1-bits are assigned to the respective 2nd, 6th and 7th rows, and used originally as control bit to DS2 level signal.

As has been shown, with the frame transmission system according to the present invention, up to eight DS2 level signals can be accommodated in the DS3.C-bit parity frame. A high degree of freedom thus is obtainable in view of the impossibility of accommodating any DS2 level signal in the prior art DS3.C bit parity frame.

Figure 5:
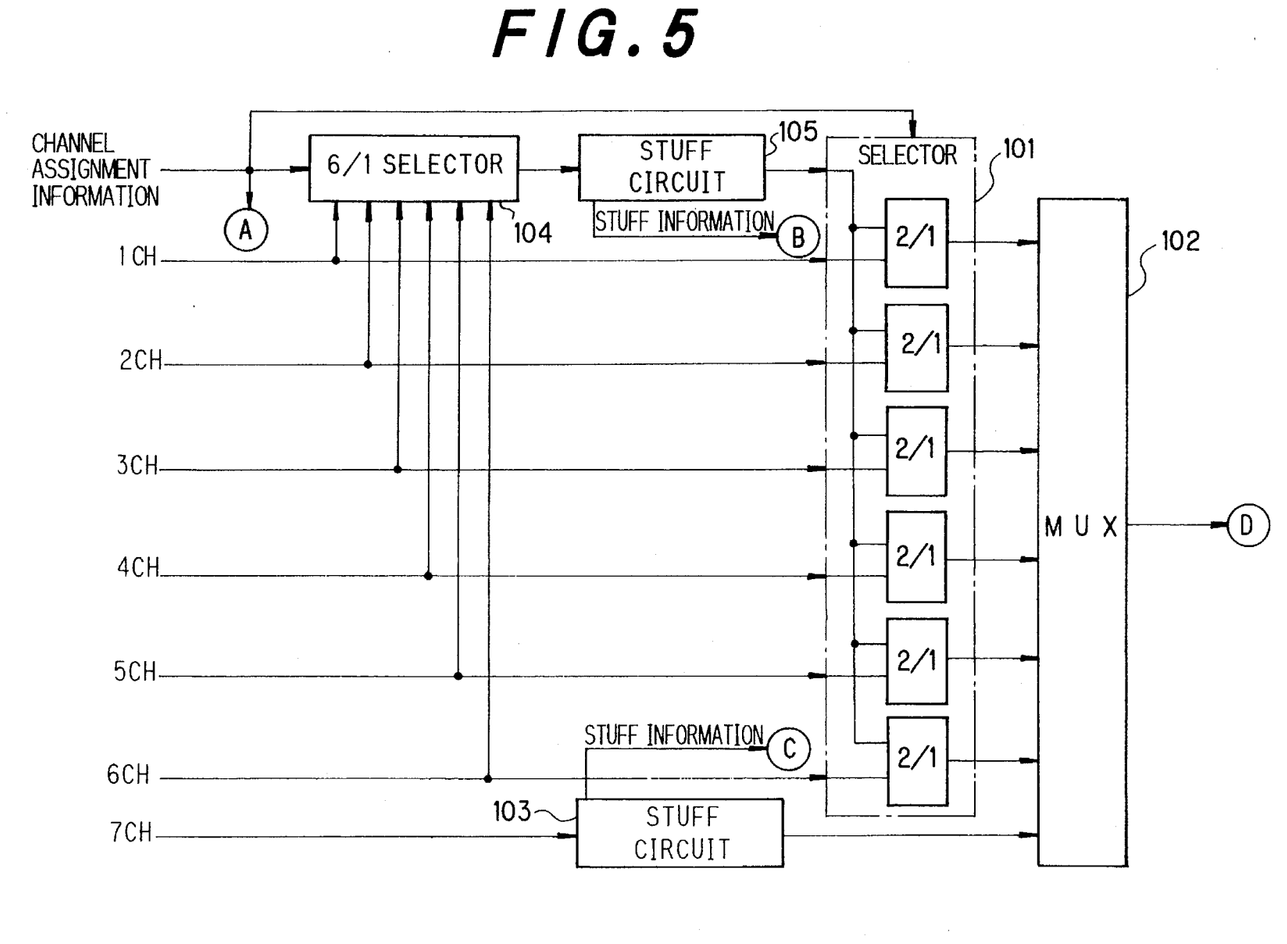
FIGS. 5 and 6 show block diagrams of the transmitter in the embodiment of the present invention.
Figure 6:
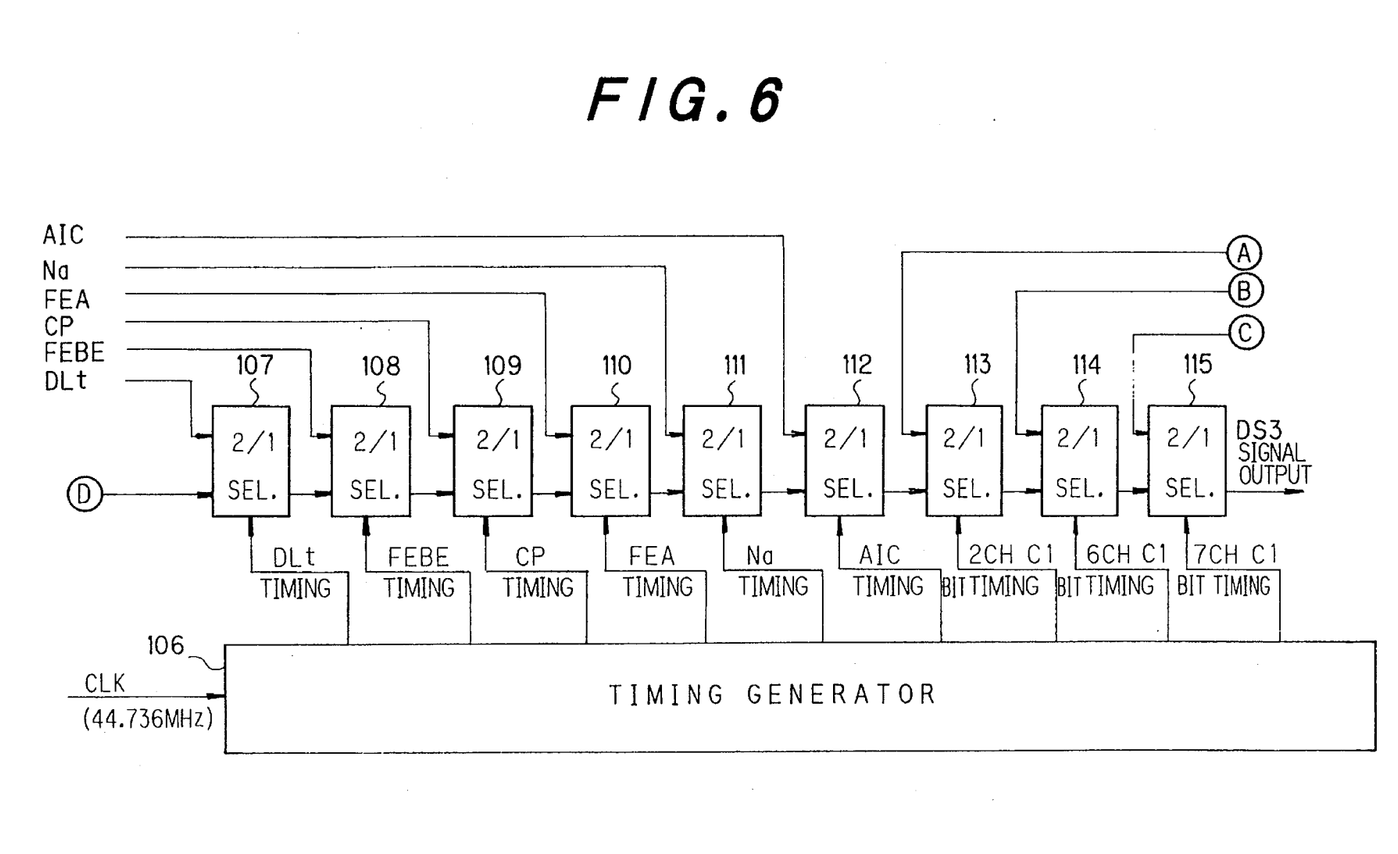

FIGS. 5 and 6 are block diagrams showing the transmitter in the embodiment of the present invention. In this embodiment, one externally supplied DS2 level signal is accommodated in the 7th channel among the three, i.e., 2nd, 6th and 7th, channels with the out-of-use C1-bits, and another external DS2 level signal is accommodated in another one of the three channels. For the stuff information (3 bits) for the externally supplied DS2 level signal to be accommodated in the 7th channel, the out-of-use C1-bits (3 bits) of the 7th channel are used. For the channel assignment information (sufficiently with 3 bits) for assigning the channel for accommodating the other externally supplied DS2 level signal the out-of-use C1-bits (3 bits) of the 2nd channel are used, and for the stuff information (3 bits) for this DS2 level signal the out-of-use C1-bits (3 bits) of the 6th channel are used.

Of the 1st to 7th channels constituting the DS3 level C-bit parity multi-frame shown in FIG. 9, the signals of the 1st to 6th channels are supplied to a selector 101, shown in FIG. 5. The selector 101 includes 2:1 selectors each provided for each channel. The outputs of these selectors are applied to a multiplexer 102. The 7th channel signal is directly input to a stuff circuit 103 for stuff processing before being input to the multiplexer 102. The stuff circuit 103 outputs 3-bit stuff information.

A 6:1 selector selectively passes signal of an assigned one of the 1st to 6th channels assigned by external channel assignment information collectively to a stuff circuit 105. In the stuff circuit 105 the selected channel signal is also stuff processed to be supplied as the other inputs to the individual element selectors of the selector 101. The stuff circuit 105 also outputs 3-bit stuff information.

In the selector 101, only the element selector corresponding to the channel assigned by the channel assignment information is controlled for switching, and thus the signal of the assigned channel that has been stuff processed in the stuff circuit 105 is derived. The other component selectors derive the input channel signals. Thus, the multiplexer 102 produces DS3 level signal, in which the externally supplied DS2 level signals are each accommodated in each of two channels, i.e., the 7th channel and the assigned one of the 1st to 6th channels.

This multiplexer output is an input to the circuit with control bits as shown in FIG. 6. The circuit with control bits includes a timing generator 106, which generates timings representing the positions of the individual control bits in the frame by counting clock pulses (at the same clock rate as the DS3 level signal at 44.736 MHz), and nine 2:1 selectors 107 to 115 in cascade connection.

The selectors 107 to 112 serve to add respective control bits DLt, FEBE, CP, FEA, Na and AIC. The selectors 113 to 115 serve to add channel assignment information, stuff information of DS2 level signal accommodated in a channel other than the 7th and stuff information of DS2 level signal accommodated in the 7th channel, respectively. With this arrangement, the two DS2 level signals having been stuff processed can be accommodated in the 7th channel and another channel to be collectively sent out as the DS3 level signal.

Figure 7:
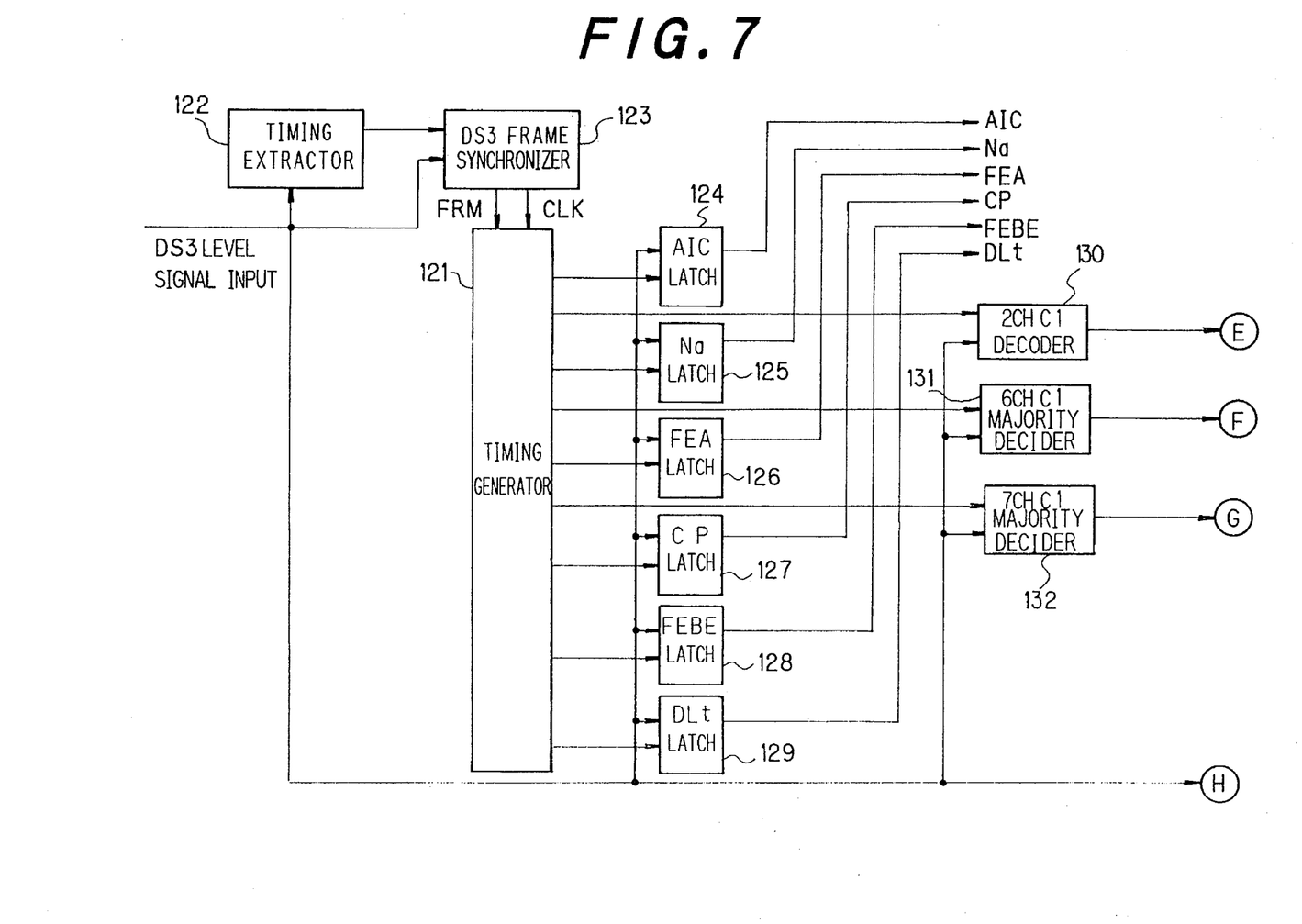
FIGS. 7 and 8 show the receiver in the embodiment, which receives the multiplexed output (i.e., DS3 level signal) from the transmitter for conversion to the DS2 level signals.
Figure 8:
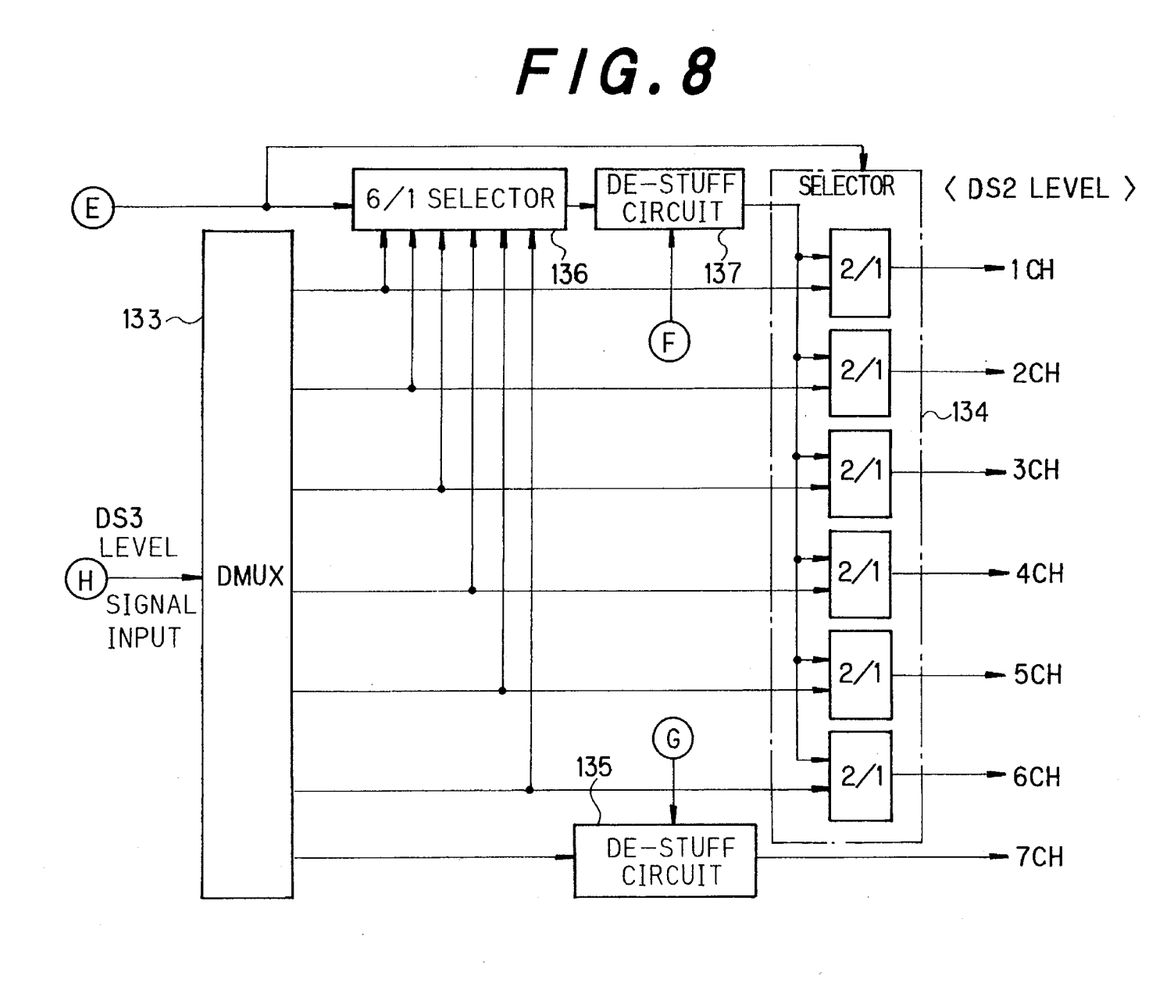

FIGS. 7 and 8 show the receiver in the embodiment, which receives the multiplexed output (i.e., DS3 level signal) from the transmitter described above for conversion to the DS2 level signals.

As shown in FIG. 7, the received DS3 level signal is supplied to a timing generator 121, a timing extractor 122 and a DS3 frame synchronizer circuit 123. The individual control bits in the DS3 level signal are thus extracted. A timing generator 121 generates various control bit extraction timings according to a clock signal CLK and a frame signal FRM, these signals being obtained from the respective timing extractor 122 and DS3 frame synchronizer 123.

Latch circuits 124 to 129 extract and latch the respective control bits from the received DS3 level signal in synchronization with the control bit extraction timings. A 2nd channel C1 decoder 130 receives and decodes the 2nd channel C1-bits (3 bits), and it provides channel assignment information as its output. A 6th and a 7th channel C1 majority deciders 131 and 132 receive the respective 6th and 7th channel C1-bits (3 bits each) and make the majority decision values of these 3 bits each to be provided as de-stuff information.

Referring to FIG. 8, the received DS3 level signal is supplied to a de-multiplexer 133 for de-multiplexing into the 7 channel signals, which are each supplied as one input to each of 2:1 selectors in a selector 134. Only the 7th channel signal is directly input to a de-stuff circuit 135 for de-stuff processing according to de-stuff information for the 7th channel.

The 1st to 6th channel signals are supplied to a 6:1 selector 136, which passes only the signal of the channel assigned by the channel assignment information to a de-stuff circuit 137 for the de-stuff according to the de-stuff information. The output of the de-stuff circuit 137 is supplied as the other input to each of the 2:1 selectors in the selector 134. Only the selector that corresponds to the channel assigned by the channel assignment information selectively passes the output of the de-stuff circuit 137. In this way, the DS2 level signals are output separately.

In the above embodiment, on the C1-bit of the 7th channel the stuff information about the externally supplied DS2 level signal to be accommodated in that channel was superimposed. However, it is possible to superimpose, on the C1-bits of the 2nd channel, the stuff information about the DS2 level signal to be accommodated in that channel and also superimpose, on the C1-bits of the 6th and 7th channels, the stuff information and channel assignment information, respectively, about the signal to be accommodated in a channel other than the 2nd.

Further, it is possible to superimpose, on the C1-bits of the 6th channel, the stuff information of the DS2 level signal to be accommodated in that channel while superimposing, on the C1-bits of the 2nd and 7th channels, the stuff information and channel assignment information, respectively, about the signal to be accommodated in a channel other than the 6th.

According to the present invention, with 3×3 out-of-use C1-bits used as control information about externally supplied DS2 level signals to be accommodated, at least two DS2 level signals that are externally input can be accommodated in a DS3 level signal.

What is claimed is:

1. A transmitter for transmitting DS3 frames each having a plurality of channels, first, second, and third channels among said plurality of channels each including three control bits, said transmitter comprising:

a first stuff circuit for accommodating a DS2 level signal in the first channel;

means for superimposing stuff information of the first stuff circuit on the control bits of the first channel;

a second stuff circuit for accommodating a different DS2 signal in an externally assigned channel other than the first channel;

means for superimposing the stuff information of the second stuff circuit on the control bits of the second channel; and means for superimposing channel assignment information indicative of the externally assigned channel on the control bits of the third channel.

2. A DS3 frame transmitter/receiver comprising:

means for receiving a DS3 level signal having a plurality of channels;

means for extracting channel assignment information from control bits stored in a channel among said plurality of channels;

means for extracting first and second stuff information respectively from control bits stored in two other channels among said plurality of channels;

a first de-stuff circuit for de-stuffing a channel assigned by the channel assignment information according to the first stuff information; and a second de-stuff circuit for de-stuffing another channel according to the second stuff information.

3. The transmitter according to claim 1, further comprising a selector which receives DS2 level signals from said plurality of channels excluding said first channel and selects said different DS2 signal based on said channel assignment information for processing in said second stuff circuit.

4. The transmitter according to claim 3, further comprising a plurality of 2/1 selectors assigned to each of said plurality of channels excluding said first channel, each of said 2/1 selectors receiving a DS2 level signal from a corresponding channel and an output signal from said second stuff circuit, each of said 2/1 selectors transmitting as an output a corresponding DS2 level signal except for a 2/1 selector corresponding to said externally assigned channel which transmits as an output said output signal from said second stuff circuit.

5. The transmitter according to claim 4, further comprising a multiplexer receiving and processing as a multiplexed signal an output signal from said first stuff circuit and said output signals from said plurality of 2/1 selectors which include said output signal from said second stuff circuit.

6. The transmitter according to claim 5, further comprising:

- a timing generator providing timings which represent positions of additional control bits in said DS3 frames and timings of said first, second, and third channels; and
- a plurality of bit adders arranged in a cascaded manner, said bit adders concatenating to said multiplexed signal, said other control bits, said channel assignment information, said output signal from said first stuff circuit, and said output signal from said second stuff circuit in accordance with corresponding signals received from said timing generator, wherein an output from a last of said bit adders connected in said cascaded manner represents a DS3 level signal output.

7. The DS3 frame transmitter/receiver according to claim 2, further comprising a demultiplexer which processes said DS3 level signal to produce a plurality of interim DS2 level signals, each of said plurality of interim DS2 level signals corresponding to a respective one of said plurality of channels.

8. The DS3 frame transmitter/receiver according to claim 7, wherein an interim DS2 level signal corresponding to said another channel is supplied to said second de-stuff circuit to produce a final DS2 level signal for said another channel.

9. The DS3 frame transmitter/receiver according to claim 8, further comprising a selector which receives interim DS2 level signals from each of said plurality of channels excluding said another channel and selects only an interim DS2 level signal corresponding to said channel assigned by the channel assignment information.

10. The DS3 frame transmitter/receiver according to claim 9, wherein an output of said selector is supplied to said first de-stuff circuit to produce a final DS2 level signal for said channel by the channel assignment information.

11. The DS3 frame transmitter/receiver according to claim 10, further comprising a plurality of 2/1 selectors assigned to said each of said plurality of channels excluding said another channel, each 2/1 selector receiving an interim DS2 level signal from a corresponding channel and an output signal from said first de-stuff circuit, said each 2/1 selector transmitting as an output a corresponding interim DS2 level signal except for a 2/1 selector corresponding to said channel assigned by the channel assignment information which transmits as an output said output signal from said first de-stuff circuit, wherein outputs from said plurality of 2/1 selectors and said output signal from said second de-stuff circuit constitute a plurality of final DS2 level signals.

12. The DS3 frame transmitter/receiver according to claim 2, further comprising a timing extractor, a frame synchronizer, and a timing generator by which control bits of said DS3 level signal are extracted.

* * * * *